US010613223B2

(12) United States Patent
Zuffada et al.

(10) Patent No.: US 10,613,223 B2
(45) Date of Patent: Apr. 7, 2020

(54) METHOD OF DETECTING OBJECTS, CORRESPONDING SYSTEM AND APPARATUS

(71) Applicant: STMicroelectronics S.r.l., Agrate Brianza (IT)

(72) Inventors: Maurizio Zuffada, Milan (IT); Angelo Dati, Milan (IT); Salvatore Mario Rotolo, Milan (IT); Melchiorre Bruccoleri, Rho (IT); Antonio Fincato, Cameri (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 300 days.

(21) Appl. No.: 15/687,033

(22) Filed: Aug. 25, 2017

(65) Prior Publication Data

US 2018/0188368 A1 Jul. 5, 2018

(30) Foreign Application Priority Data

Jan. 3, 2017 (IT) .................. 102017000000532

(51) Int. Cl.
| | | |
|---|---|---|
| *G01S 17/02* | (2020.01) | |
| *G01S 17/93* | (2020.01) | |
| *G01S 7/486* | (2020.01) | |
| *G01S 7/4863* | (2020.01) | |
| *G01S 7/487* | (2006.01) | |
| *G01S 7/4865* | (2020.01) | |
| *G01S 17/10* | (2020.01) | |

(52) U.S. Cl.
CPC ............ *G01S 17/026* (2013.01); *G01S 7/487* (2013.01); *G01S 7/4863* (2013.01); *G01S 7/4865* (2013.01); *G01S 7/4868* (2013.01); *G01S 17/936* (2013.01); *G01S 17/102* (2013.01)

(58) Field of Classification Search
CPC ...... G01S 7/4868; G01S 7/487; G01S 7/4865; G01S 17/936; G01S 7/4863; G01S 17/026; G01S 17/102
USPC ....................................... 356/4.01
See application file for complete search history.

(56) References Cited

U.S. PATENT DOCUMENTS

| | | |
|---|---|---|
| 6,393,377 B1 | 5/2002 | Shirai et al. |
| 2008/0246944 A1 | 10/2008 | Redman et al. |
| 2015/0285625 A1 | 10/2015 | Deane |
| 2016/0306044 A1* | 10/2016 | Smits ............... G01S 17/66 |
| 2016/0327646 A1 | 11/2016 | Scheim et al. |

FOREIGN PATENT DOCUMENTS

| | | |
|---|---|---|
| DE | 199 47 023 A1 | 5/2001 |
| EP | 2 887 096 A1 | 6/2015 |

* cited by examiner

*Primary Examiner* — Daniel L Murphy
(74) *Attorney, Agent, or Firm* — Seed IP Law Group LLP

(57) ABSTRACT

A system for detecting objects, for driver assistance equipment in motor vehicles for example, includes a transmitter for transmitting towards an object an optical signal having a signal energy. The optical signal transmitted includes at least one encoded pulse sequence with the signal energy distributed over the pulse sequence. A receiver receives an echo signal resulting from reflection of the optical signal at the object with the time delay of the echo signal is indicative of the distance to the object.

19 Claims, 4 Drawing Sheets

METHOD OF DETECTING OBJECTS, CORRESPONDING SYSTEM AND APPARATUS

BACKGROUND

Technical Field

The present description relates generally to electro-optical systems and more specifically to infrared light detection and ranging, for instance in Advanced Driver Assistance System (ADAS) applications in the automotive field.

Description of the Related Art

Modern vehicles such as, e.g., motor vehicles, make extensive use of sensors and systems that are able to detect in real time the external environment surrounding the vehicle. Radars and lidars (light detection and ranging) may play a significant role for that purpose.

Lidar systems, where "LIDAR" is an acronym for Light Detection And Ranging, may include pulsed laser sources, operating, e.g., at near infrared wavelengths, which repetitively scan an external field of view surrounding the car by covering a distance up to few hundred meters with the ability to identify fixed or fast moving objects with dimensions of few centimeters. Operation of such a system may involve a laser source (e.g., array of lasers) emitting a pulse of light "τ" of few nanoseconds with a repetition time "T" of few tenths of microseconds. The emitted laser pulses are concentrated in a small light spot, that hits the target placed at a distance "D", and is scattered back to a receiver including an optical system (e.g., a telescopic lens), an array of photodetectors (e.g., Avalanche Photo Detectors—APDs) and linear TIAs (TransImpedance Amplifiers).

Measuring the delay "$\tau_D$" between the emitted pulse and the received echo makes it possible to calculate the distance between, e.g., a car and a target object, as well as the speed and the direction of the target object.

Present-day lidars operate at wavelengths of 905 nm and, in order to reliably detect low reflectivity (6%) objects placed at distances of 100 meters, pulses emitted from the transmitter may have a spot energy of about 1 microJ (microJoule). This corresponds to a laser pulse peak power of the order of 100-200 W, which comes close to the limit recommended by eye safety specifications.

That amount of spot energy is related to receiver APD responsivity being limited to about 60-100 A/W. Additionally, APD arrays exhibit spatial size limitations, e.g., in terms of density for unit size. Also, achieving a laser pulse power as indicated in the foregoing involves providing a correspondingly high current via the laser drive electronics. This translates into high power consumption, also placing severe constraints on reliability and cost.

BRIEF SUMMARY

Despite the extensive activity in that area, a demand is still felt for improved solutions, e.g., as regards facilitating the removal of the heat produced by a die.

The claims are an integral part of the technical disclosure of embodiments as provided herein.

According to one or more embodiments, instead of emitting a single pulse, a laser may emit a digital encoded pseudo-random sequence of N pulses with a total duration of "$N_\tau$".

In one or more embodiments, instead of including an APD array, a corresponding receiver may include a (low cost) high-density array of SPADs (Single Photon Avalanche Detectors).

In one or more embodiments, the electronics at the transmitter and at the receiver may be configured to operate on a pseudo-random pulse sequence of N bits.

In one or more embodiments, a delayed echo of the transmitted pseudo random sequence may be detected by a SPAD sensor operating, e.g., in the Geiger mode, with the echo possibly validated (only) if coherent with the transmitted signal.

One or more embodiments may include an electro-optical system arrangement including an electronic digital pattern generator, a laser driver, an infrared laser source, with an optical lens arrangement and a synchronous photodetector array and with post-processing applied for low-cost, low-power detection and ranging applications.

In one or more embodiments, a digital pattern generator may modulate a laser which "flashes" a given target field of view with a high frame rate.

In one or more embodiments, light reflected back from the target may be focused through an optical system on a photodetector array which is digitally synchronized to a transmitted sequence.

In one or more embodiments, digital post-processing may be applied in order to discriminate between false echoes and true time-of-flight reflected echoes, thus facilitating achieving an acceptable source error rate at long ranging distances with target size accuracy.

One or more embodiments make it possible to provide a sort of "long range radar" at a cost which may be significantly lower than a conventional continuous wave/pulse microwave/laser system, e.g., due to the transmission power being reduced for a same field of coverage and/or due to the use of a receiver including intrinsically simpler sensor elements such as SPAD elements.

One or more embodiments may involve an (intrinsic) averaging operation which makes it possible to use signals that are weaker than those used in conventional solutions.

While other types of detectors may be used in one or more embodiments, this type of operation may well match with using SPAD detectors exhibiting good properties in terms of, e.g., density of integration and efficiency in detecting weak signals.

In addition to detecting the distance (range) to an object, one more embodiments may be applied to detecting relative speed of that object.

Also, one or more embodiments may be applied to more complex tasks such as, e.g., object and/or scene recognition.

BRIEF DESCRIPTION OF THE SEVERAL VIEWS OF THE DRAWINGS

One or more embodiments will now be described, by way of example only, with reference to the annexed figures, wherein.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

An electro-optical system exemplary of one or more embodiments may be a Lidar (Light Detection And Ranging) system.

Figure 1:
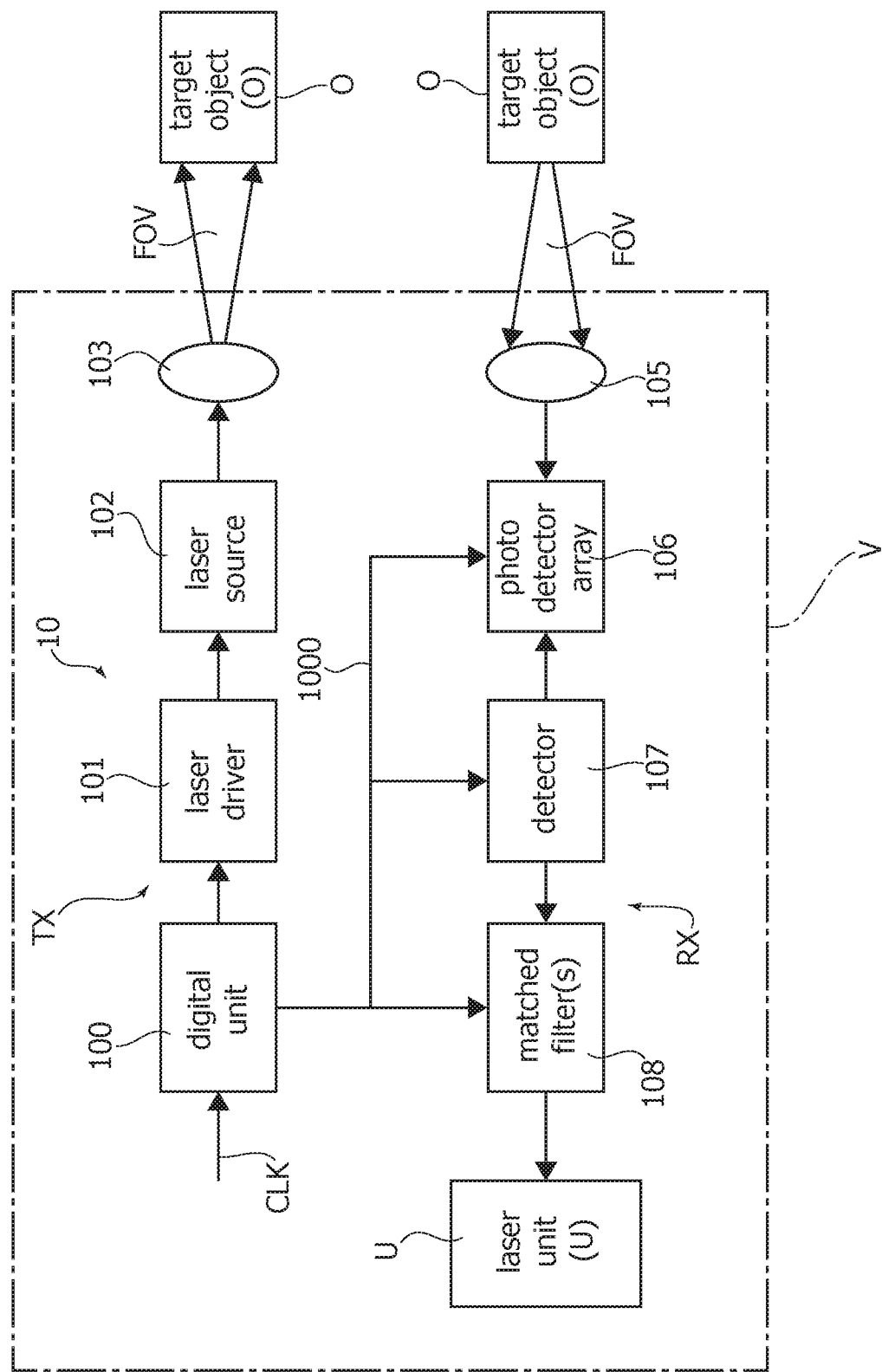
FIG. 1 is a block diagram exemplary of one or more embodiments of the present disclosure.

One such system, generally designated 10 in FIG. 1 may be capable of detecting with good accuracy a "target" object O (both fixed and moving) placed at a distance (possibly >100 m).

A system such as the system 10 exemplified in FIG. 1 may be mounted on-board a road vehicle V such as a motor vehicle (e.g., a motor car), possibly as a part of ADAS (Advanced Driver Assistance System) equipment of the vehicle.

The availability of low-cost, low-power and compact-sized systems of that kind may play a role in present-day and future automotive and robotic applications.

In one or more embodiments one such system 100 may include two parts, namely: a transmitter (TX) and a receiver (RX).

Figure 2:
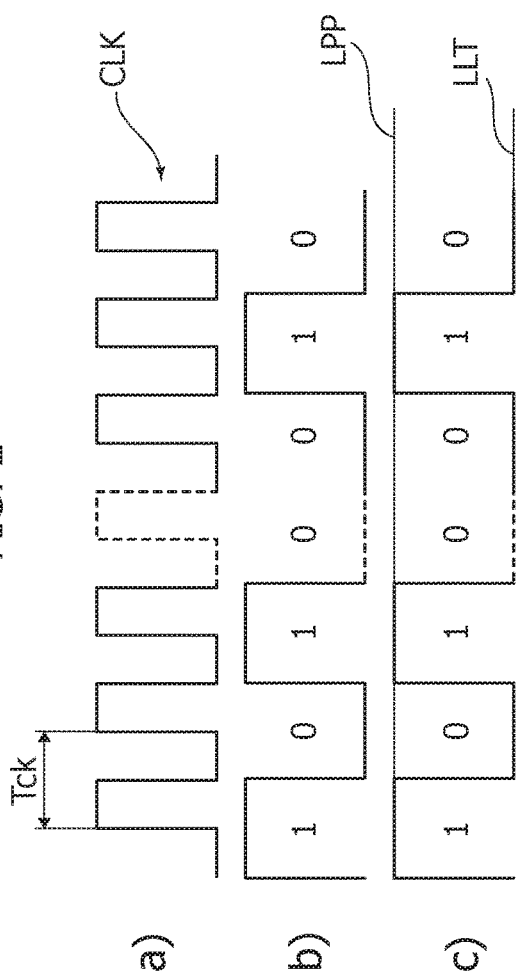
FIG. 2, including three portions, designated a), b) and c), respectively, is exemplary of a possible time behavior of signals in one or more embodiments.

In one or more embodiments, the transmitter may include a digital unit 100 which, based on a given clock signal CLK (as exemplified in portion a) of FIG. 2) may generate an, e.g., pseudo-random coded pulse sequence of duration of N clock cycles (as exemplified in portion b) of FIG. 2). In one or more embodiments, a clock signal CLK of a period Tck may be generated by a clock generator of a known type, not visible in the figure.

In one or more embodiments, the digital pulse sequence from the unit 100 may be fed to a laser driver 101 that modulates the power emitted by a laser source 102. In one or more embodiments such a source may include a plurality of lasers arranged in array configuration. Low-cost, infrared laser(s) may be exemplary of such a laser source.

Thus, an optical signal including (at least one) light pulse sequence corresponding to the coded pulse sequence generated by the unit 100 may be emitted by the laser 102, as exemplified in portion c) of FIG. 2 where LLT and LPP denote the laser lasing threshold and the laser peak power, respectively.

The light power emitted by the laser 102 is then fed to an optical (e.g., lens) system 103, to be (uniformly) distributed over given field of view (FOV), having, e.g., a rectangular shape, possibly having a horizontal extension wider than its vertical extension. The light thus projected illuminates a given scene with a certain power/m$^2$ within the FOV, as uniformly as possible.

In one or more embodiments, the code associated with the pulse sequence emitted by the transmitter—see, e.g., portions b) and c) of FIG. 2)—may change at each "flash", with flashes repeating at a given frequency repetition rate FRR (Hz).

By assuming—as is reasonably the case—that the power LLT emitted by the laser source for a zero input is (much) lower than LPP, and may thus be neglected, the total average power AP per second hitting (i.e., injected into) the FOV may be expressed as:

$$AP = LPP*\alpha*N*Tck*FRR/[(\tan VFOV*\tan HFOV)*D^2] \quad (1)$$

where:
- LPP is the laser peak power,
- α is the number of bits of the digital pulse sequence different from 0,
- N is the number of clock cycles of the digital sequence,
- $T_{ck}$ is the clock cycle time duration,
- FRR is the frequency repetition rate,
- HFOV and VFOF are the horizontal and the vertical widths of the field of view (FOV),
- D is the distance to the target O.

In one or more embodiments, the optical system 103 may include a scanning device configured for generating a collimated beam and directing the beam over the angular range (HFOV, VFOV) of the FOV, e.g., by using a raster technique.

In one or more embodiments a single flash may be replaced by multiple flashes each one illuminating a respective (smaller) part of the FOV, with the capability of providing as uniform as possible an illumination within the FOV.

Whatever the specific details of implementation, in one or more embodiments, light emitted by the (e.g., infrared) laser 102 via the optical system 103 may hit a "target" object O within the illuminated FOV and be reflected back to the receiver RX.

For the sake of clarity a (single) object O is depicted twice in FIG. 1, that is both as a "target" hit by an optical signal from the transmitter TX and as a source of an echo signal sent back to the receiver RX as a result of the optical signal being reflected at the object.

In one or more embodiments, the receiver RX may include an optical (e.g., lens) system 105, sized and dimensioned in order to gather at least a portion of the reflected power from the object O that is focused onto a photodetector (PD) array 106.

In one or more embodiments, the optical system 105 in the receiver RX may include an optical band-pass filter to select (only) the "useful" transmitted light and reject spurious light from external sources. In one or more embodiments, the optical band-pass filter may include a multilayer structure deposited (e.g., coated) on a dedicated optical window or directly on one of the focusing lenses.

In one or more embodiments (as further detailed in the following in connections with FIGS. 5 and 6) the photodetector array 106 may include SPADs (Single Photon Avalanche Detectors), optionally arranged in matrix of photodiodes operating, e.g., in a Geiger mode. In one or more embodiments, based on photodiode quantum efficiency (at the operating wavelength of the system), size and overvoltage (ΔV) above breakdown ($V_B$), a few thousand photons reflected by a target object O may be able to trigger a single photodiode avalanche current by multiplying each captured photon many times, e.g., many thousand times.

By way of reference, the average power of the light reflected back from a target object O with a surface size $S_T$ and a reflectivity R at a given distance D from the transmitter, may be approximated by the expression (1) discussed in the foregoing multiplied by a factor β given by:

$$\beta = S_T * R/(2*\pi*D^2) \quad (2)$$

where:
  $S_T$ is the surface of the target object within the FOV,
  R is the reflectivity of the target object, and
  D is the distance of the target object O from the system 10.

Figure 3:
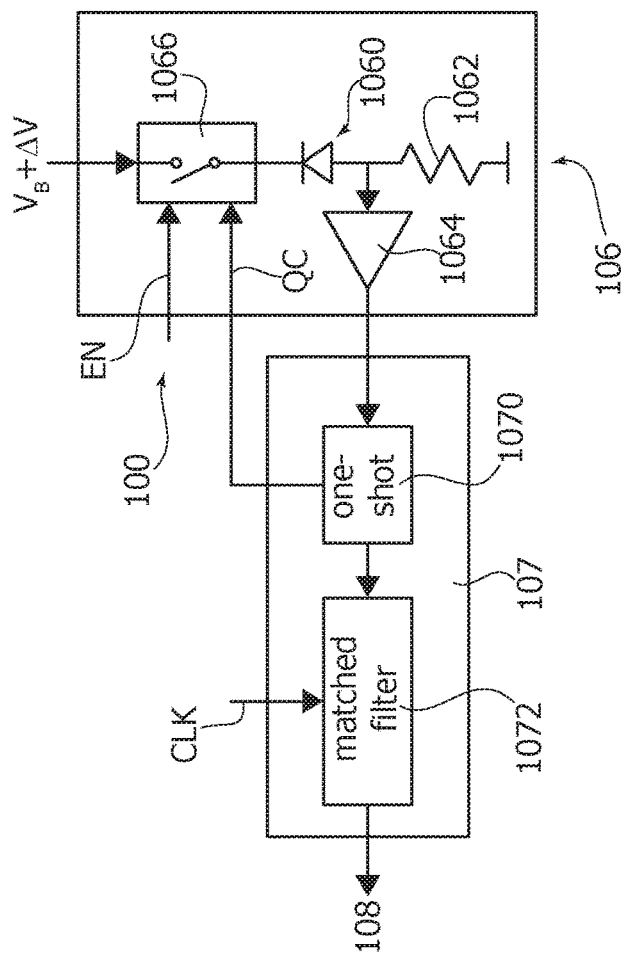
FIG. 3 is a block diagram exemplary of possible details of embodiments.

The diagram of FIG. 3 is exemplary of an array of photodetectors 1060 (only one of these is represented for simplicity) configured—e.g., by coupling with a low impedance "sink" resistance 1062—to provide an electrical (photodetection) signal to an output amplifier stage 1064 such as a transimpedance amplifier (TIA).

In one or more embodiments, such an array 106 may be activated as a function of a (digital) signal EN (Enable) which may be provided by the generator 100 synchronous with the Tx digital pattern generated thereby.

In one or more embodiments, as exemplified in FIG. 3, the signal EN may become active as a result of a new digital sequence being generated by the transmitter 100.

In one or more embodiments the signal EN may maintain that state over a certain time duration, selected, e.g., equal to twice the maximum operating range (Lmax) of the system 10 divided by the speed of light (c).

In one or more embodiments the signal EN may thus trigger a detector activation time window having a duration related to the expected time-of-flight of a pulse in the system 10, that is the time taken for a pulse emitted by the transmitter TX for i) reaching an object at the maximum operating range Lmax of the system (that is the farthest expected distance of objects O to be detected) and ii) being received at the receiver RX after being reflected back by that object.

In one or more embodiments, the enable signal EN may perform a sort of internal "cleaning" of the receiver, which may possibly be exploited for confirming a target.

In one or more embodiments (e.g., those using SPAD detectors), the possibility may exist of "blinding" the detectors in order to avoid secondary emission phenomena.

In one or more embodiments, each photodiode (e.g., 1060) in the array 106 may then receive a (digital) quench digital command QC provided by a Rx synchronous detector block 107, which may again be coupled with the generator 100.

In one or more embodiments, the quench signal QC may reset (each) photodiode 1060 immediately after the photo current has been triggered over a given threshold.

Such kind of operation is schematically represented in FIG. 3 as a (notional) switch 1066 coupled with the diode 1060, with the switch 1066 alternatively switched "on" and "off" by the signals EN and QC, respectively.

For instance, in one or more embodiments, as a result of a photodiode 1060 in the array 106 being enabled (EN), e.g., with the received photons triggering an avalanche current (Geiger multiplication), a one shot circuit 1070 in the synchronous detector 107 may produce an output (digital) signal QC in order to quench the photodiode 1060, e.g., so that this may be available for a subsequent Geiger photomultiplication.

In one or more embodiments, the output from the one shot trigger 1070 may be fed to a matched filter 1072 of, e.g., N bits (according to the length of the transmitted sequence). Such matched filter has an impulse response matching exactly the digital pattern being tested for reception, and whose output in time domain represents the pattern autocorrelation.

In one or more embodiments, the matched filter 1072 may be clocked by the reference clock CLK of the digital sequence generator 100 in the transmitter TX.

Thus, in one or more embodiments, both the original transmitted pulse sequence hitting a "target" object O in a flashed FOV and its reflected echoes may be made available to be post-processed (e.g., in a correlator 108) for a given minimum error ratio as set in view of the intended application.

The result of detection as generated, e.g., at 108 may then be exploited (in a manner known per se) by a "user" unit U such as, e.g., a display unit, a warning system as possibly mounted on board of the vehicle V.

As discussed previously, Lidar systems may facilitate overcoming distance limitations exhibited by microwave apparatus in ADAS applications, where a detection capability in excess of 100 m may represent an asset.

A maximum emitted power of, e.g., up to 200 W (instantaneous power) may be required by certain systems in order to permit detection of targets of small reflectivity in the presence of ambient light noise. Such a power level may represent a negative factor, e.g., for class A safety and cost for these systems.

Detection reliability may be enhanced by firing multiple pulses at a target O with an increased repetition rate, which however may be limited by the time needed to scan the entire field of view (FOV) and by the time for the echo from the deepest scanned field—where the signal is weakest—to travel back to the system.

For instance, the maximum theoretical scanning frequency f may be limited by the following approximation:

$$f \leq c/2L\max$$

where:
  c=speed of light;
  Lmax=max field depth
that approximation yielding 750 KHz for Lmax=200 m:

One or more embodiments as exemplified herein may rely on a modification of the transmitted sequence (e.g., at the generator 100) that makes it possible to reduce the transmitted peak power (e.g., LPP in portion c) of FIG. 3).

In one or more embodiments, such a modification may avoid single pulse transmission—which suffers from maximum peak power limitation as discussed—as well as continuous wave (CW) transmission—which, while failing to provide improved detection performance, may involve further limits, e.g., in terms of maximum permissible energy for safety.

In one or more embodiments, a minimally correlated pseudo-random sequence (see, e.g., portions b) and c) of FIG. 2) may be transmitted by the laser 102 and detected at the receiver RX, e.g., via a correlator or post-processor 108, including, e.g., a Maximum Likelihood detector.

In one or more embodiments, such sequence (or possibly, a family of sequences: as indicated, in one or more embodiments, the code associated with the pulse sequence emitted by the transmitter may change at each "flash") may be devised as a train of pulses spaced by a minimum resolution T, which is also the instantaneous resolution of the detector.

In one or more embodiments, each sequence may extend over a maximum, fixed time span and may include a given, fixed number N of non zero pulses.

Such a sequence may be notated conventionally {xk} so that:

if xk=0 at time t=kT, no pulse is output;
if xk=1 at time t=kT, a single pulse of length T is emitted.

In one or more embodiments, the exact shape of the pulses may not play a significant role for the present treatment.

Denoting as kT the discrete transmission time, and {x(N)k} a transmitted sequence of N non zero pulses, in one or more embodiments a sequence may be constructed (crafted) such that:

$$E\{x_k \cdot x_m\} = \begin{cases} N \text{ for } m = k \\ \leq 1 \text{ otherwise} \end{cases}$$

with E{ } denoting the expectation value.

If more than a sequence is transmitted, the sequences may be constructed such that:

$$E\{x_k^a \cdot x_m^b\} = \begin{cases} N \text{ for } a = b, k = m \\ \leq 1 \text{ otherwise} \end{cases}$$

Sequences complying with the conditions above may be constructed in various ways.

A possible construction technique is discussed in the following, merely by way of example, with reference to the flow chart of FIG. 4.

For a sequence of N pulses, after a START STEP, in a step 200 a minimum number is selected to create a set S={a}. This will correspond to a sequence of N=2 (non-zero) pulses separated by a−1 zeroes, namely x(0)=1, x(a)=1, x(k)=0 otherwise.

Then, in a step 202 a second number b, non zero and strictly different from a is added. The set S={a,b} now consists in a sequence of N=3 pulses of length a+b with {0, a, a+b} as the only non-zero elements. It will be noted that a+b, a−b, b−a is not selected as an element of S.

The process is continued (as collectively indicated by block 204 in the flow chart of FIG. 4) by adding integer elements to S requiring that no linear combination of elements of S over the {−1, 0, 1} set is an element of S, or:

$$\sum_{a_i \in S} v_i \cdot a_i \text{ not in } S, v_i \in \{-1, 0, 1\}$$

A sequence suitable for transmission will be obtained when S has N elements.

The process discussed previously may be repeated based on the outcome of a step 206, indicative of whether a single sequence or plural sequences intended to be used in an embodiment.

For instance, the process may be repeated to produce 2N elements, so that two subsets of N elements each may be used as two sequences with the desired properties.

Figure 4:
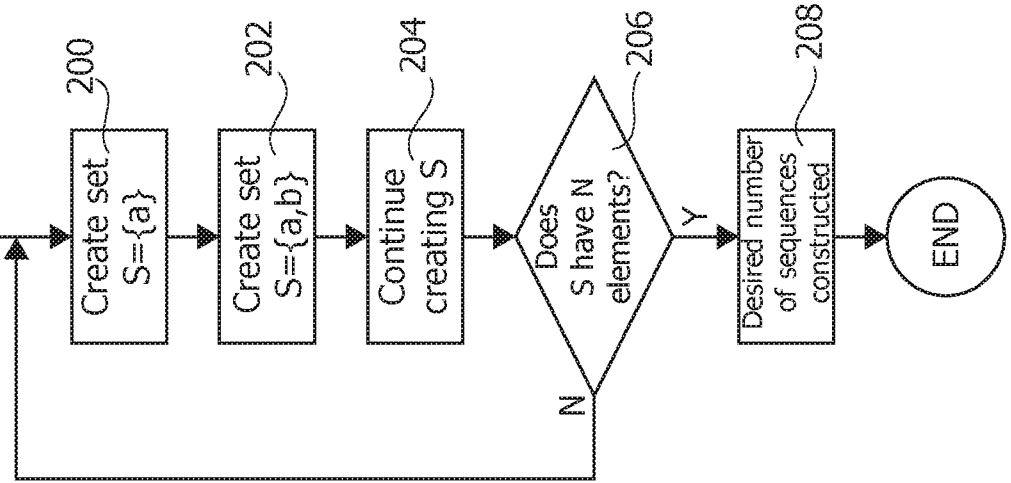
FIG. 4 is a flow chart exemplary of sequence construction in one or more embodiments.

The step 208 in the flow chart of FIG. 4 is representative of a desired number of sequences (one or more) having been constructed and made available for transmission.

In certain embodiments the sequence(s) may be constructed in such a way that a spacing between two pulses is at least one pulse length, e.g., T. Such an (optional) constraint may facilitate resorting to SPAD receiver detector arrangements.

The proposed sequence(s) were found to appreciably enhance detection reliability.

By way of reference, simulated performance in noisy conditions for a 150 m echo, in case of a 2× peak power reduction and compared with output performance of a Matched Filter (MF) observer for nominal power exhibited a 150 m echo clearly dwarfed by noise.

Performance was then evaluated with reference to an embodiment including a single shot with a simple sequence [11010001] with N=4 non-zero pulses. In that case the two times (2×) power reduction was found to be compensated by the structure in the sequence, with the 2× loss recovered by a matched filter (MF) detector matched to the known sequence.

The gain of a patterned transmission may be essentially independent of the number of distinct candidate patterns at the receiver; usage of multiple patterns for detection may be traded against receiver complexity.

Multiple pattern detection intrinsically enables a higher pattern transmission rate, which can eventually translate into a higher frame rate.

It was otherwise noted that making the transmission sequence longer does appreciably limit system resolution, which is still dictated by the minimum constituent pulse width (T), while the minimum applicable distance for the system operation may be affected (e.g., limited). It was otherwise noted that maximum pulse energies may not be required at shorter distances. Consequently, in one or more embodiments, shorter distances can be dealt with, e.g., by interleaving "modified" sequences as discussed herein, with conventional methods of pulse transmission.

In one or more embodiments, a higher frame rate can be achieved as follows: two joint, minimally correlated sequences xa, xb can be fired with twice the repetition rate, with sequence type detection making it possible for the detector to become aware of which sequence is being received. The concept can be extended to a multiplicity of transmitted sequence patterns.

Adopting such an approach may achieve a net gain—e.g., sqrt(N)—over the peak power required at the transmitter: observing this shows how the sequence and related matched filter (MF) detection system may effectively address (compensate) the power reduction requirement at the transmitter, while providing just a minor contribution to the overall system cost.

It may also be observed that reliability of a single detection for the receiver RX may be (directly) proportional to the incoming radiation power, which in turn is given by the product of the incoming radiation density and the detector active area. Since the radiation density reflected by the target is a function (e.g., proportional) to the transmitted peak power, ultimately reducing the peak power may thus be regarded as corresponding to a reduction in the active area for the receiver RX. Also, one or more embodiments may be intended for operating in environments where the signal at the receiver may be weak in comparison with the "worst case" environment.

In one or more embodiments, these issues may be addressed by selecting a suitable receiver structure, while still permitting miniaturization.

In one or more embodiments (at least) three different types or classes of photodetector may be considered for the array 106:

PIN diode, that is a diode having a P-type region ("P") and a N-type region ("N") with an undoped intrinsic ("I") therebetween;

Avalanche Photo Diode (APD);

Single Photon Avalanche Detector (SPAD).

In an arrangement as exemplified in FIG. 3, in the case of PIN diodes and APDs, the photocurrent induced in the detector 1060 by absorption of a photon flux may be evaluated, e.g., sinking the current on a low impedance load 1062, with an active transimpedance amplifier (TIA) 1064 having an intrinsic noise independent of the receiver area. The TIA noise may be relevant for those photodetectors where the signal is not amplified by a photo multiplication factor.

Factoring the noise contribution over a scaling area (e.g., diode, incoming flux) in the presence of a fixed detection noise contribution (e.g., a TIA) that does not appreciably scale with area, may lead to detection noise being finally dominated by the non-scaling contribution of the noise, thus yielding a decreased reliability for smaller areas.

Conversely, SPAD detectors may not require a TIA (thus intrinsically eliminating a reliability detractor) while intrinsic dark current is proportional to the detection area.

A detection event can either occur as a "false positive", or indicate a real target presence. An efficient detector should trigger with near certainty only in the presence of a valid target.

This situation may be expressed in quantitative terms by resorting to the likelihood ratio (LR) of the "hit" over the "false", or:

$$LR = \frac{P(\text{light} | \text{detection})}{P(\text{dark} | \text{detection})}$$

This is a measure of the information carried by the detection event in order to discriminate a "hit" over a "false": a higher value of LR is indicative of a higher likelihood for a detection to be triggered by a real target.

For instance, for an APD, the LR ratio may be expressed as:

$$APD\ LR \cong \frac{1}{Q(\sqrt{n_1})}$$

where Q is the integral of the Gaussian distribution, also known as Q-function—linked to the complementary error function as $Q(x)=0.5*\text{erfc}(x/\text{sqrt}(2))$ and n1=average number of avalanche triggering photons, light condition.

Conversely for a SPAD, the LR ratio may be expressed as:

$$SPAD\ LR = \frac{1-e^{-n_1}}{1-e^{-n_0}} \cong \frac{1}{n_0}$$

where n0=average number of avalanche triggering photons, dark condition.

These ni values (that is n1 and n0) are directly proportional to the detection area, and comparing, e.g., the logarithms of the Likelihood Ratio for the cases of APD (PIN) detectors and SPAD detectors shows that at smaller areas SPAD detection becomes intrinsically more reliable than the APD.

System performance may be evaluated, e.g., in terms of a representative figure of merit that averages "false detection without light" and "no detection with light", with performance for a SPAD cluster covering an equivalent area of a single APD being adapted to be evaluated, e.g., by noting that not the whole active area considered but just, e.g., 50% may be covered by active SPADs.

For the sake of comparison one may assume that all the original APD area is irradiated uniformly by an incoming photon flux averaging <n1> photons per time interval T, while an ambient background radiation averaging <n0> photons per time interval T may be considered.

Performance curves plotted for various sequences of a given number of pulses as discussed previously clearly indicate a (much) better error rate performance for a SPAD detector, over a wide range of RX reference power.

Figure 5:
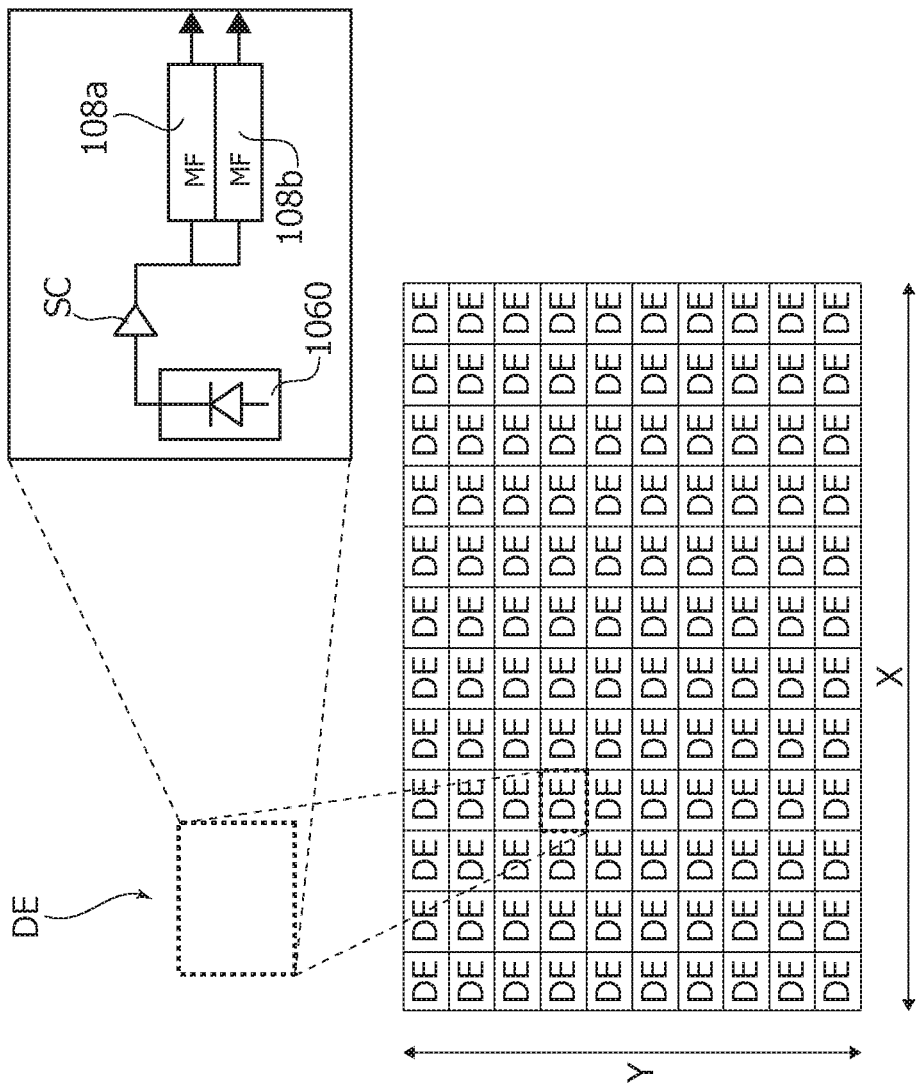
FIGS. 5 and 6 are exemplary of possible operation of embodiments.
Figure 6:
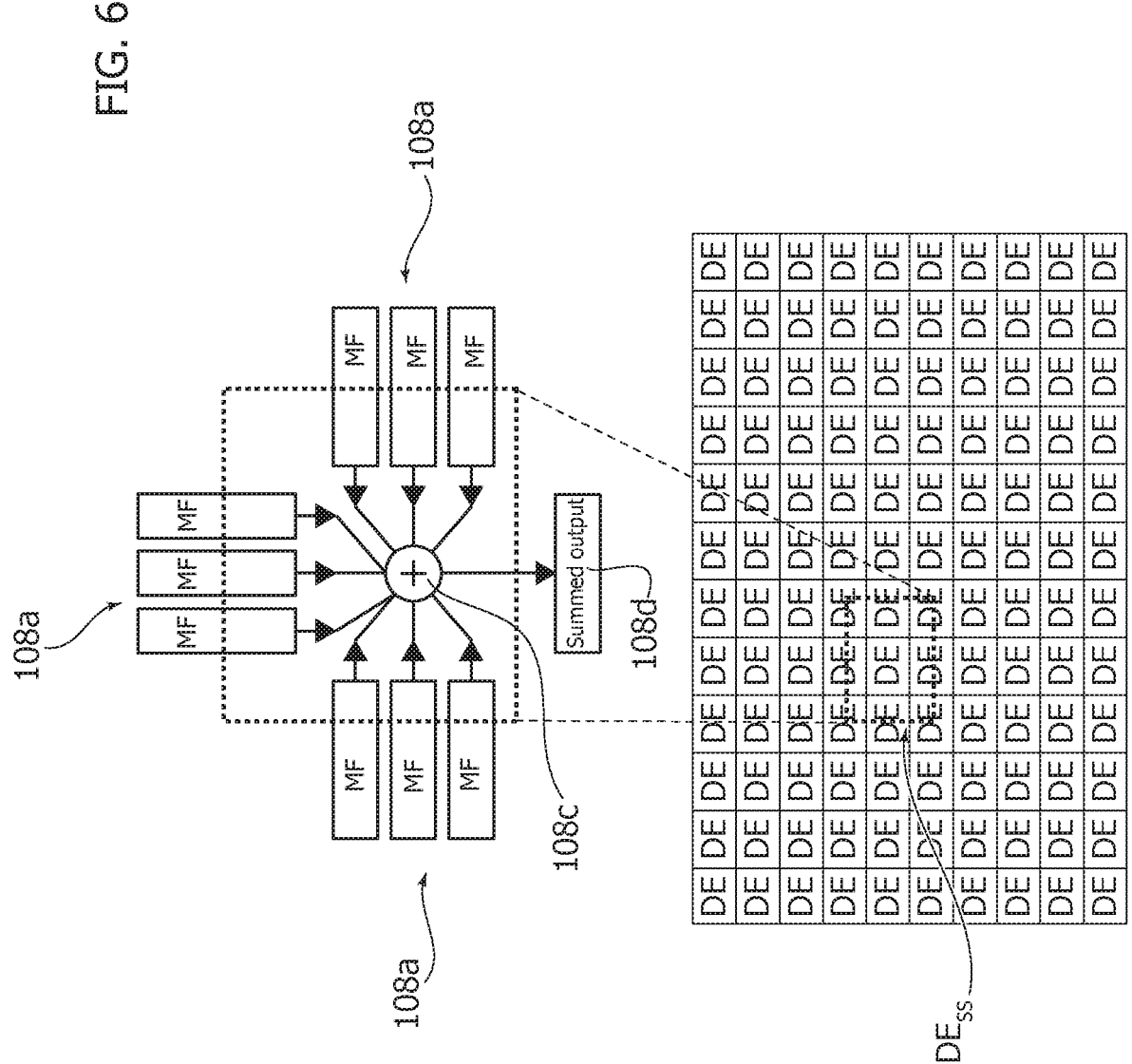

FIGS. 5 and 6 provide additional detail of a possible layout of the receiver RX.

In one or more embodiments, an array 106 of detection elements DE (e.g., SPAD's) may be arranged, e.g., in an X,Y plane to cover the area illuminated by the receiver optics 105: for instance the selected arrangement may be adapted to "cover" the reflected radiation gathered over the whole field of view (FOV) of the system. In that respect it will be appreciated that a rectangular/square detector arrangement as shown is merely exemplary insofar as one or more embodiments may adopt a different pattern (e.g., circular).

In one or more embodiments each element DE may include:
- a photo detector 1060 (e.g., PIN/APD/SPAD, with a SPAD solution facilitating miniaturization and a possibly better usage of available area as discussed previously);
- a signal conditioning circuit (see, e.g., FIG. 3) which may facilitate extracting the current from the photo multiplication effect and driving the detector; and
- one (or more) matched filters MF, e.g., 108a, 108b each one matched with the perspective sequences transmitted, which may correspond to at least part of the processor circuit 108 of FIG. 1.

In one or more embodiments, the output from the matched filters 108a, 108b may be sampled synchronously with the transmitter reference (see, e.g., line 1000 in FIG. 1) in order to provide an adequately accurate reference for measuring the time of flight.

In one or more embodiments, the output of all DEs in the array 106 may be expected to be available simultaneously for the whole matrix for signal processing. If a number MA of matched filters are present in each DE, MA·X·Y outputs are available at any given sampling time.

In one or more embodiments, for each sequence type, the system (e.g., the processor 108 of FIG. 1) may add together (e.g., at 108d in FIG. 6) the instantaneous output of a set of filters matched to the same sequence (e.g., matched filters 108a, as exemplified in FIG. 6), with a decision taken (e.g., at 108c) by using either the whole array or a subset $DE_{ss}$ as exemplified in FIG. 6, with, e.g., the possibility of processing plural subsets in parallel.

The representation of FIG. 6, refers—by way of example—to filtering matched to a selected sequence and to a selected shape, as defined by the photodetector cluster selected for the subsets $DE_{ss}$.

The representation of FIG. 6 is exemplary of a matched filter over time and space for the square shown in FIG. 6, namely nine filters over time added over nine spots in space.

At least notionally, with an adequate resolution, also recognition of selected shapes may be implemented using detection according to one or more embodiments.

In one or more embodiments, by assuming that the outputs from a number G of matched filters are summed together (e.g., at 108c) for a given cluster (in the exemplary simplified case of FIG. 6 G=9), and that the output from each matched filter r is md$_r$(kT), the input of the decision device 108d may be expressed as:

$$din(kT) = \sum_{r=1}^{G} md_r(kT)$$

In one or more embodiments that summed output may be compared against a given threshold to declare detection.

In one or more embodiments, further advantages may be taken from this processing, e.g., by causing the decision device 108c to store a set most "promising" detection locations {k1, k2, . . . , km} and further process the stored values at each frame repetition.

One or more embodiments may thus relate to a method of detecting objects (e.g., O), the method including:
transmitting (see, e.g., 100, 101, 102, 103 in FIG. 1) an optical signal having a signal energy towards an object,
receiving (see, e.g., 105, 106, 107, 108 in FIG. 1) an echo signal resulting from reflection of the optical signal at (e.g., by) the object, wherein the time delay of the echo signal is indicative of the distance to (and, possibly of the relative speed of) the object,
wherein the optical signal transmitted includes at least one encoded pulse sequence (e.g., {x(N)k}), wherein the signal energy is distributed over the pulse sequence.

In one or more embodiments, receiving the echo signal resulting from reflection of the optical signal at the object may include matched filter processing (e.g., 108a, 108b in FIGS. 5 and 6) of the echo signal.

In one or more embodiments, the matched filter processing may include adding together (see, e.g., 108c in FIG. 6) the outputs of a set of filters (108a) matched to a same encoded sequence in the optical signal transmitted.

One or more embodiments may include synchronizing (e.g., EN, QC, 1000) receiving the echo signal with transmitting the optical signal including at least one encoded pulse sequence, wherein receiving the echo signal takes place within a time window enabled by transmission (e.g., 100) of the optical signal.

One or more embodiments may include:
selecting a farthest distance (e.g., Lmax) of detectable objects,
calculating a propagation time for said optical signal to be received as an echo signal resulting from reflection at an object located at said farthest distance, and
setting the duration of said time window as a function of said propagation time.

In one or more embodiments, said at least one encoded pulse sequence may include spaced pulses, wherein spacing between pulses is equal to at least one pulse (that is the duration T of at least one pulse).

In one or more embodiments, transmission of said optical signal including at least one encoded pulse sequence may be interleaved by transmission of single pulse optical signals.

In one or more embodiments may include a system for detecting objects may include:

a transmitter (e.g., 100, 101, 102, 103) for transmitting towards an object an optical signal having a signal energy, the optical signal transmitted including at least one encoded pulse sequence, wherein the signal energy is distributed over the pulse sequence,
a receiver (e.g., 105, 106, 107, 108) for receiving an echo signal resulting from reflection of the optical signal at the object, wherein the time delay of the echo signal is indicative of the distance to the object,
wherein the system is configured for operating with the method of one or more embodiments.

In one or more embodiments, the receiver may include a photodetector array for photoelectric conversion of said echo signal.

In one or more embodiments, the receiver may include a Single Photon Avalanche Detector (SPAD) module, optionally configured for operating in a Geiger mode.

In one or more embodiments, the receiver may include a decision module (e.g., 108d) coupled with said photodetector array to receive therefrom detection signals (e.g., from the matched filters 108a) induced by said echo signal impinging onto at least a subset (e.g., DE$_{SS}$ in FIG. 6) of the photodetectors in said photodetector array.

In one or more embodiments, a driver assistance device for motor vehicles (e.g., for ADAS applications) may include a system according to one or more embodiments.

Without prejudice to the underlying principles, the details and embodiments may vary, even significantly, with respect to what has been described in the foregoing by way of example only, without departing from the extent of protection.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
transmitting an optical signal having a signal energy towards an object, the optical signal including at least one encoded pulse sequence and the signal energy being distributed over the at least one encoded pulse sequence; and
receiving an echo signal resulting from reflection of the optical signal at the object, the echo signal having a time delay relative to the transmitted optical signal that is indicative of a distance to the object;
coordinating the receiving of the echo signal with the transmitting of the optical signal such that the receiving of the echo signal takes place within a time window enabled by the transmission of the optical signal;
selecting a farthest distance of detectable objects;
calculating a propagation time for the optical signal to be received as an echo signal resulting from reflection off an object located at the farthest distance; and
setting a duration of the time window as a function of the propagation time.

2. The method of claim 1, wherein receiving the echo signal resulting from reflection of the optical signal at the object includes matched filter processing of the echo signal.

3. The method of claim 2, wherein said matched filter processing includes adding together the outputs of a set of filters matched to a same encoded sequence in the transmitted optical signal.

4. The method of claim 1, wherein transmitting the optical signal comprises transmitting the optical signal having at least one encoded pulse sequence including spaced pulses, the spacing between pulses being equal to a duration of at least one pulse in the encoded pulse sequence.

5. The method of claim 1, wherein transmitting the optical signal comprises transmitting the optical pulse signal having at least one encoded pulse sequence interleaved by transmission of single pulse optical signals.

6. The method of claim 1, wherein the at least one encoded pulse sequence comprises a minimally correlated pseudo-random sequence.

7. A system, comprising:
- a transmitter that in operation transmits an optical signal towards an object, the optical signal including at least one encoded pulse sequence, a code associated with the at least one encoded pulse sequence being changed at a time of the object being flashed, and the optical signal having a signal energy distributed over the at least one encoded pulse sequence; and
- a receiver that in operation receives an echo signal resulting from reflection of the optical signal off of the object, a time delay of the echo signal being indicative of a distance between the system and the object.

8. The system of claim 7, wherein the receiver comprises a photodetector array that in operation photoelectrically converts said echo signal.

9. The system of claim 7, wherein the receiver comprises a photodetector array including an array of Single Photon Avalanche Detectors that operate in a Geiger mode to generate detection signals in response to the echo signal.

10. The system of claim 9, wherein the receiver further comprises a decision circuit coupled to the photodetector array to receive the detection signals.

11. The system of claim 9, wherein the receiver further comprises at least one matched filter that in operation filters the detection signals.

12. The system of claim 11, wherein the at least one matched filter comprises a plurality of filters matched to the same at least one encoded pulse sequence of the transmitted optical signal.

13. The system of claim 7 wherein the receiver is enabled to detect signals during a time window, the time window has a duration that is set based on a propagation time of the optical signal to be received as an echo signal resulting from reflection off an object located at a farthest distance of detectable objects.

14. The system of claim 7 wherein the transmitter is configured to interleave modified pulse sequences with the at least one encoded pulse sequence.

15. The system of claim 7 wherein the object is flashed at a predetermined frequency, and the code associated with the at least one encoded pulse sequence is changed at each flash.

16. A system, comprising:
- a driver assistance apparatus for motor vehicles, the apparatus including:
  - a transmitter configured to transmit an optical signal including at least one encoded pulse sequence and having a signal energy distributed over the at least one encoded pulse sequence, and configured to interleave modified pulse sequences with the at least one encoded pulse sequence; and
  - a receiver configured to receive a return signal corresponding to a portion of the transmitted optical reflected off an object within a field of view of the system, the receiver configured to determine a distance to the object based on a time delay between the return signal and the transmitted optical signal.

17. The system of claim 16, wherein the receiver further comprises a photodetector array configured to generate detection signals based on the return signal.

18. The system of claim 17, wherein the receiver further comprises a detector configured to utilize a likelihood ratio calculation for the generated detection signals to detect a distance to the object.

19. The system of claim 18, wherein the receiver further comprises at least one matched filter that in operation filters the generated detection signals.

* * * * *